Sept. 16, 1924.  
J. J. FINDLATER  
METHOD OF FORMING RING GEARS  
Filed Nov. 19, 1923  
1,508,387
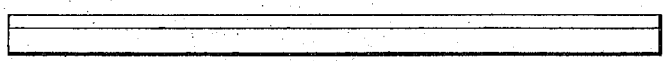
Fig. 1
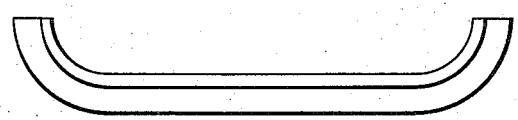
Fig. 2
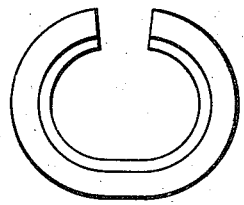 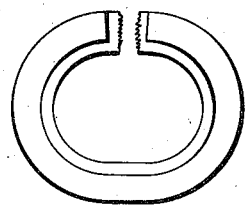
Fig. 3      Fig. 4
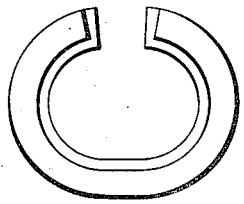 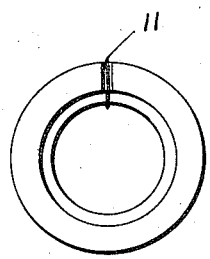
Fig. 5      Fig. 6
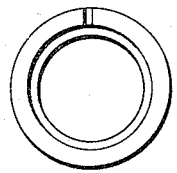  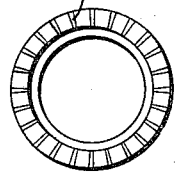 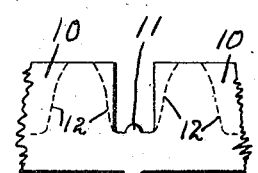
Fig. 7    Fig. 8   Fig. 9    Fig. 10
WITNESS:  
H. L. Marchialette
INVENTOR.  
John J. Findlater  
BY  
E. L. Jarvis  
ATTORNEY.

Patented Sept. 16, 1924.

1,508,387

UNITED STATES PATENT OFFICE.

JOHN J. FINDLATER, OF HIGHLAND PARK, MICHIGAN, ASSIGNOR TO FORD MOTOR COMPANY, OF DETROIT, MICHIGAN, A CORPORATION OF DELAWARE.

METHOD OF FORMING RING GEARS.

Application filed November 19, 1923. Serial No. 675,652.

*To all whom it may concern:*

Be it known that I, JOHN J. FINDLATER, a citizen of the United States, and residing in the city of Highland Park, in the county of Wayne and State of Michigan, have invented new and useful Improvements in a Method of Forming Ring Gears, of which the following is a specification.

The object of my invention is to provide improvements in a gear of simple, durable, and inexpensive construction.

A further object of my invention is to provide a method of forming a gear whereby the material used may be a rolled section as distinguished from billet stock which must be forged to the general shape of the gear desired.

A further object of my invention is to form a ring gear from a strip of stock by cutting the stock to lengths and welding the ends of each length together to form a ring from which the gear may be formed.

A further object of my invention is to provide a peculiar form of strip which may be readily rolled in an ordinary rolling mill and which when formed by welding into a ring will be peculiarly adapted for forming a gear.

A further object is to provide a gear in which the grain of the material of all of its teeth will be uniform whereby the wear will be equal.

A further object of my invention is to provide a gear formed from a strip of stock cut to length and having its ends welded together in such a way that the material of the welded joint will not form a part of the rolling surface of any of the teeth of the gear so that the wear on such teeth will not be affected by any variation of the material of the gear due to the welding.

A further object of my invention is to provide a method of making circular or ring blanks for various articles requiring such blanks from strip stock cut to length and having the ends of the lengths welded together.

With these and other objects in view, my invention consists in the arrangement, combination and construction of the various parts of my improved device, as described in the specification, claimed in my claim, and shown in the accompanying drawings, in which:

Figure 1 shows an elevation and end view of stock rolled to proper cross-section and cut to proper length for the forming of my improved gear.

Figures 2 to 9 inclusive show the successive steps in the forming of the gear from the strip shown in Figure 1 as will hereinafter more fully be described; and Figure 10 shows an enlarged detail view to illustrate the manner of forming the teeth in the blank after it has been shaped to circular form and is ready to have the teeth formed therein.

Referring to the accompanying drawings I first suggest that the various operations for shaping the blank herein described are performed on an ordinary punch press as distinguished from a forging machine such for instance as the Ajax machine or a steam hammer. The saving in the forming of the gear on the punch press as distinguished from a forging press will be readily appreciated by those skilled in the art of metal working.

The blank shown in Figure 1 is placed in a suitable die in a punch press and shaped to the form shown in Figure 2; that is, the ends are bent up to about ninety degrees. The second operation consists in placing the strip shown in Figure 2 in dies and forming the central portion of the strip so that it assumes the shape shown in Figure 3 which is slightly oval with the ends of the blanks spread apart an appreciable distance.

It will be noted by referring to the end view of the blank with which this operation started in Figure 1 that the blank is formed to have a beveled side at 10 so that the blank has the appearance in cross section of an oblong with a triangular projection adjacent to one edge thereof and on one side thereof. This triangular projection is the portion from which the teeth of this ring gear are formed.

Referring to Figure 4 the blank is shown there as having this triangular portion removed adjacent to each end of the blank. This is accomplished by placing the blank between suitable dies to flatten the ends, and then again using dies to shear the ends of the blank to make them straight.

In connection with the particular gear with which I have largely used this invention of mine, the outside diameter of the gear is between six and eight inches and the triangular portion of the stock is flattened out a distance of about one half inch from each end of the blank. After this operation the blank is put in another die and shaped to the form shown in Figure 5 to bring it more nearly to such a shape that when the ends are brought together and welded then that the completed ring will have a substantially true circular shape. This blank shown in Figure 5 is placed in a butt welding machine and the ends welded together as shown in Figure 6. These ends being welded, leave a flashing 11 which extends outwardly from the joint at which these ends are welded. Referring to Figure 10 it will be noted that this flash and the amount of the material taken up by the weld is so arranged that the distance between the ends of the triangular portion 10 is materially less than the width across the bottom of the trough between the teeth of the gear which is to be formed. These teeth are indicated by the dotted lines 12 in Figure 10. The gear blank with the flash thereon is placed in a punch press between suitable dies and sheared off as is indicated in Figure 7. This blank is then machined and if necessary ground and trued to the form of a true circle and then teeth 13 are formed in the ring in the triangular portion thereof as is illustrated in Figure 9.

It will be understood that this method of forming circular blanks or ring blanks is not necessarily limited to gears but other adaptations thereof will readily occur to those skilled in the art.

Among the many advantages arising from the use of my improved device, it may first be brought out that it is much cheaper to form a ring shaped object by forming it from flat strip stock and then welding the ends to form a ring than it is to form a similar ring shaped blank from a block of material which has to be punched and then spread or stretched to form a ring of the desired diameter. This is cheaper because the forming of strip stock can be accomplished in an ordinary rolling machine and the diameter of the stock to be formed is relatively so much smaller that the expense of handling it is very reasonable. It is further cheaper because a ring gear such as is formed by the improved method as described herein may be formed in punch presses as distinguished from forging machines or steam hammers so that the operating cost and the time of the operation are both largely decreased.

Some changes may be made in the arrangement and construction of the various parts of my improved device without departing from the spirit of the invention therein, and it is my intention to cover by my claim such changes as may be reasonably included within the scope thereof.

I claim as my invention.

The method of forming ring gears consisting of cutting strip stock to lengths, then forming the lengths to approximately the desired shape, then welding the ends of the lengths together to form a continuous ring, then shearing the flash from the weld, and then generating the teeth in the blank so formed, the teeth being generated in the blank in such position that the wearing surface of the teeth will not be formed by the welded portion of the length of stock.

Dated Sept. 25th, 1923.

JOHN J. FINDLATER.